US009902877B2

(12) United States Patent
Engelhard et al.

(10) Patent No.: US 9,902,877 B2
(45) Date of Patent: Feb. 27, 2018

(54) SEPARATING FILM HAVING A FOAMED STRUCTURE

(75) Inventors: Heinz Engelhard, Nürnberg (DE); Michael Fürst, Heiligenstadt (DE); Jürgen Panhans, Erlangen (DE); Matthias Mauser, Hausen (DE)

(73) Assignee: INFIANA GERMANY GMBH & CO., KG, Forchheim (DE)

(*) Notice: Subject to any disclaimer, the term of this patent is extended or adjusted under 35 U.S.C. 154(b) by 353 days.

(21) Appl. No.: 13/458,004

(22) Filed: Apr. 27, 2012

(65) Prior Publication Data

US 2012/0258272 A1    Oct. 11, 2012

Related U.S. Application Data

(63) Continuation of application No. PCT/EP2010/007032, filed on Nov. 19, 2010.

(30) Foreign Application Priority Data

Nov. 24, 2009 (DE) .................. 10 2009 054 322

(51) Int. Cl.
B32B 5/16 (2006.01)
B32B 33/00 (2006.01)
C09J 7/02 (2006.01)

(52) U.S. Cl.
CPC ....... C09J 7/0235 (2013.01); *C09J 2400/243* (2013.01); *C09J 2477/001* (2013.01); *C09J 2483/005* (2013.01); *Y10T 428/1405* (2015.01); *Y10T 428/249972* (2015.04)

(58) Field of Classification Search
None
See application file for complete search history.

(56) References Cited

U.S. PATENT DOCUMENTS

| 4,075,389 A | | 2/1978 | Vassiliades et al. |
| 4,182,788 A | | 1/1980 | Vassiliades et al. |
| 4,502,889 A | * | 3/1985 | Kurita ................. 106/287.12 |
| 5,232,756 A | | 8/1993 | Chang et al. |
| 6,326,072 B1 | | 12/2001 | Ojeda et al. |
| 6,440,566 B1 | * | 8/2002 | Maligie et al. ........... 428/412 |
| 2004/0054071 A1 | * | 3/2004 | Gobelt et al. ............. 524/588 |
| 2004/0109968 A1 | * | 6/2004 | Furst ........................ 428/40.1 |
| 2005/0003216 A1 | | 1/2005 | Frances et al. |
| 2006/0019083 A1 | * | 1/2006 | Giogetta ................. 428/304.4 |
| 2007/0048478 A1 | * | 3/2007 | Webster ................... 428/40.1 |
| 2007/0224378 A1 | | 9/2007 | Takeuchi et al. |
| 2007/0254971 A1 | * | 11/2007 | De Vogel et al. ........... 521/59 |
| 2008/0193696 A1 | * | 8/2008 | Hayes ....................... 428/41.8 |

FOREIGN PATENT DOCUMENTS

| DE | 22 02 217 A1 | 9/1973 |
| DE | 2302217 A1 | 9/1973 |
| DE | 69 22 6383 T2 | 11/1998 |
| DE | 69 92 4761 T2 | 1/2006 |
| EP | 0 191 003 A1 | 8/1986 |
| EP | 0 257 984 A2 | 3/1988 |
| EP | 0 769 540 A2 | 4/1997 |
| EP | 1 277 802 A1 | 1/2003 |
| JP | S48100437 A | 12/1973 |
| JP | 63-072532 A | 4/1988 |
| JP | 002002001726 A | 1/2002 |
| JP | 002006265479 A | 10/2006 |
| JP | 2007-069380 A | 3/2007 |
| JP | 002007254580 A | 10/2007 |
| JP | 2007528910 A | 10/2007 |
| WO | 1998/00470 A1 | 1/1998 |

OTHER PUBLICATIONS

JG Summit, Polypropylene MSDS, retrieved Dec. 11, 2012, http://www.jgspetrochem.com/Evalene%20Polypropylene%20-%20MSDS.pdf, pp. 1-8.*
ChemicalBook, Polyacrylonitrile MSDS, retrieved Dec. 11, 2012, http://www.chemicalbook.com/ChemicalProductProperty_US_CB9199592.aspx, pp. 1-2.*
TexWire, Polyvinyl Chloride MSDS, retrieved Dec. 11, 2012, http://www.texwire.us/cablewire/pvcproperties.html, pp. 1-2.*
InChem, Polystyrene MSDS, retrieved Dec. 11, 2012, http://www.inchem.org/documents/icsc/icsc/eics1043.htm, pp. 1-2.*
International Search Report dated Mar. 3, 2011, dated Mar. 14, 2011.
Translation of International Search Report dated Mar. 3, 2011, dated Mar. 14, 2011.

* cited by examiner

*Primary Examiner* — Callie E Shosho
*Assistant Examiner* — Patrick N English
(74) *Attorney, Agent, or Firm* — Norris McLaughlin & Marcus P.A.

(57) ABSTRACT

Separating film, comprising at least one layer(s) having a foamed structure of at least one thermoplastic polymer, at least one of the surfaces of the separating film being provided with a release layer (b) of at least one cured polysiloxane as an outer layer, the use thereof as a detachable protective and covering film, and roofing membrane provided with the separating film as a detachable protective and covering film.

15 Claims, No Drawings

SEPARATING FILM HAVING A FOAMED STRUCTURE

This application is a Continuation of PCT/EP2010/007032 filed Nov. 19, 2010, which claims priority to German application 10 2009 054 322.8 filed 24 Nov. 2009.

The present invention relates to a release film comprising at least one layer (s) with a closed-cell foam structure based on at least one thermoplastic polymer, where at least one of the surfaces of the release film has been equipped with a release layer (b) as external layer based on at least one hardened polysiloxane, and the closed-cell foam structure is based on expanded, hollow, spherical microbeads, the expansion of which has been achieved via at least one volatile organic compound present therein, to a use of this type of release film as peelable protective film and peelable protective-covering film, and also to roof sheeting provided with a release film of this type as peelable protective film and peelable protective-covering film.

BACKGROUND OF THE INVENTION

Release films are widely used as peelable protective films for adhesive tapes or self-adhesive labels, in order to prevent sticking of these single- or double-sided adhesive products during storage. They must moreover exhibit sufficient anti-adhesive effect.

The prior art, e.g. EP 1 277 802 A1 or EP 0 769 540 A2, has previously disclosed release films which have been siliconized at least on one side in order to achieve good release effect.

However, the release effect of the known release films is insufficient for some technical applications where the requirement is to provide a peelable protective film to materials which exhibit strong adhesion even at ambient temperature, the result being that when adhesive products of this type are handled, in particular during the removal of the release film, difficulties arise in the peeling process.

The prior art attempts to improve the release effect of conventional release films in relation to materials of this type exhibiting strong adhesion by equipping the release films with an embossment structure. A disadvantage, for release effect, with provision of this type of embossment structure is that the embossment structure can be damaged on exposure to pressure, e.g. in a roll, under tension and/or under thermal stress, e.g. during stages of further processing, and the release film exhibits inadequate release effect at least at the damaged sites.

There is therefore a need for release films which in particular exhibit very good release effect in relation to strongly adhesive materials, despite the lack of any embossment structure in the release film.

It was therefore an object of the present invention to provide release films which have no embossment structure and which feature improved release effect in relation to adhesives and/or in relation to adhesive materials which exhibit high adhesion even at ambient temperature.

SUMMARY OF THE INVENTION

Said object is achieved by providing a release film comprising at least one layer (s) with closed-cell foam structure based on at least one thermoplastic polymer, where the closed-cell foam structure is based on expanded, hollow microparticles, the expansion of which has been achieved via at least one volatile, organic compound present in the cavity of the microparticles, and where at least one of the surfaces of the release film has been equipped with a release layer (b) as external layer based on at least one hardened polysiloxane.

The layer (s) of the release film of the invention is preferably based on at least one thermoplastic polymer selected from the group consisting of olefin homo- or copolymers, preferably on ethylene homo- or copolymers and/or on propylene homo- or copolymers, homo- or copolyamides, ethylene-vinyl alcohol copolymers, and polyvinyl alcohols.

DETAILED DESCRIPTION

A thermoplastic olefin homo- or copolymer which can preferably be used to produce the layer (s) of the release film of the invention is at least one thermoplastic olefin homo- or copolymer of α,β-unsaturated olefins preferably having from 2 to 6 carbon atoms, and the layer (s) can particularly preferably be based on at least one ethylene homo- or copolymer (PE, in particular LDPE or HDPE), propylene homo- or copolymer (PP), butylene homo- or copolymer (PB), or isobutylene homo- or copolymer (PI), or on a mixture of at least two of the polymers mentioned.

"LDPE" is unfoamed low-density polyethylene, the density of which is in the range from 0.86 to 0.93 g/cm$^3$, and which features a high degree of branching of the molecules. "HDPE" means unfoamed high-density polyethylene which has only a small amount of branching of the molecular chain, density being in the range from 0.94 to 0.97 g/cm$^3$.

Ethylene-vinyl alcohol copolymers (EVOH) suitable for producing the layer (s) are obtained via in essence complete hydrolysis of corresponding ethylene-containing polyvinyl acetates (EVAc). The degree of hydrolysis of said fully hydrolyzed ethylene-vinyl acetate copolymers is ≥98% and their ethylene content is from 0.01 to 80 mol %, preferably from 1 to 50 mol %.

The layer (s) can also be based on at least one polyvinyl alcohol, where this has been obtained via in essence complete hydrolysis of polyvinyl acetates (PVA) and, as fully hydrolyzed polyvinyl acetate, has a degree of hydrolysis≥98%.

The foam structure in the release film of the invention is based on expanded hollow microparticles which preferably have been distributed at least in the layer (s) and the wall (=shell) of which is preferably based on a thermoplastic polymer, particularly preferably on a (meth)acrylonitrile homo- or copolymer, and the expansion of which has been achieved with the aid of at least one volatile organic compound, preferably a volatile hydrocarbon. The boiling point of the volatile organic compound is preferably ≤60° C. at atmospheric pressure, particularly ≤50° C. at atmospheric pressure. The hollow, expanded, microparticles are preferably spherical, and their diameter is preferably from 30 μm to 300 μm, particularly preferably from 70 μm to 200 μm. The average diameter of the microparticles comprising at least one volatile compound in their cavity is from 15 μm to 30 μm prior to expansion. The melting point of the thermoplastic polymer of the layer (s) is preferably lower than that of the thermoplastic polymer from which the wall (=shell) of the hollow microparticles was produced.

To produce the foam structure of the layer (s), it is preferable to distribute, in the layer (s) of the release film of the invention, from 0.1 to 10% by weight, particularly preferably from 0.2 to 5% by weight, based in each case on the total weight of the layer (s), of the microparticles which comprise the volatile, organic compound.

Exposure to heat during the production of the layer (s) causes the expansion of the microparticles via evaporation of the volatile, organic compound. It is preferable that the diameter of the expanded microparticles is greater than the total thickness of the release film of the invention.

The density of the layer (s) is preferably from 0.2 to 1.2 g/cm$^3$, preferably from 0.5 to 1.0 g/cm$^3$.

Hardenable polysiloxanes are suitable materials for producing the release layer (b) of the release film of the invention.

For the purposes of the present invention, the term "polysiloxane" means compounds of which the polymer chains are composed of silicon atoms and oxygen atoms in alternation. A polysiloxane is based on n repeating siloxane units (—[Si(R$_2$)—O]—)$_n$, which respectively mutually independently have disubstitution by two organic moieties R, where R is preferably respectively R$^1$ or OR$^1$, and R$^1$ is respectively an alkyl moiety or an aryl moiety.

It is preferable that the hardened polysiloxane of the invention is based on a repeating dialkylsiloxane unit or on a repeating alkylarylsiloxane unit. The number of Si—O bonds possessed by an individual siloxane unit, based in each case on a tetravalent silicon atom, permits classification of said units into terminal monofunctional siloxanes (M) having one Si—O bond, difunctional siloxanes (D) having two Si—O bonds, trifunctional siloxanes (T) having three Si—O bonds, and tetrafunctional siloxanes (O) having four Si—O bonds. It is preferable that the polysiloxane of the invention has a crosslinked structure in the form of rings or chains, particularly preferably a crosslinked structure which takes the form of chains and which has been linked via (D) units, (T) units, and/or (O) units to give a two- or three-dimensional network. The number n of repeating siloxane units (—[Si(R$_2$)—O]—)$_n$ in the polysiloxane chain is termed the degree of polymerization of the polysiloxane.

The release layer (b) is preferably based on at least one hardened, i.e. crosslinked, polysiloxane selected from the group consisting of addition-crosslinked, preferably metal-catalyzed addition-crosslinked, condensation-crosslinked, free-radical-crosslinked, cationically crosslinked, and moisture crosslinked polysiloxanes.

It is preferable that the release layer (b) is based on at least one hardened polysiloxane which has been hardened via thermal hardening, via hardening by electromagnetic radiation, preferably via UV radiation, or via exposure to moisture.

Thermally hardened polysiloxanes are obtained via thermal hydrosilylation of polysiloxanes having silane functions, using a compound having at least one carbon double bond. In the case of the polysiloxanes hardened via electromagnetic radiation, the crosslinking of the polysiloxanes is brought about via electromagnetic radiation, preferably via UV radiation. The polysiloxanes crosslinked via exposure to moisture, preferably to water, are obtained via a polycondensation reaction in which at least one silane function and at least one alkoxy group or at least one alkoxysilane group form an Si—O bond with elimination of at least one molecule of alcohol. The polysiloxanes to be hardened therefore respectively have the functional groups which react with one another and which are necessary for crosslinking.

It is preferable that the release layer (b) comprises at least one leveling aid and/or at least one anchoring aid.

In one preferred embodiment, the release layer (b) comprises an amount of from 1 to 10% by weight of the leveling aid and/or comprises an amount of from 1 to 5% by weight of the anchoring aid, based in each case on the total weight of the release layer (b).

A suitable leveling aid for producing the release layer (b) is at least one polysiloxane which has at least one, preferably terminal, functional group having at least one carbon double bond, preferably at least one vinyl group, allyl group, (meth)acrylic acid group, and/or (meth)acrylic acid derivative group. It is clear here to the person skilled in the art that the functional group(s) which is/are present in the polysiloxane used as leveling aid and which is/are used for crosslinking is/are present in a modified, i.e. reacted, form after the hardening of the polysiloxane.

A suitable anchoring aid for producing the release layer (b) is at least one polysiloxane which has at least one, preferably terminal, functional group having at least one carbon double bond, preferably at least one vinyl group, allyl group, (meth)acrylic acid group, and/or (meth)acrylic acid derivative group, particularly preferably at least one (meth)acrylic ester group, or at least one epoxy group, isocyanate group, hydroxy group, amine group, amide group, carboxy group, anhydride group, alkoxy group, silane group (Si—H groups), or alkoxysilane group, particularly preferably at least one monoalkoxysilane, dialkoxysilane, and/or trialkoxysilane group. A particularly preferably suitable anchoring aid for producing the release layer (b) is at least one polysiloxane having at least one, preferably terminal, functional group selected from the group consisting of epoxy groups, (meth)acrylic acid groups, and (meth)acrylic acid derivative groups, particularly preferably (meth)acrylic ester groups. It is clear here to the person skilled in the art that the functional group(s) which is/are present in the polysiloxane used as anchoring aid and which is/are used for crosslinking is/are present in a modified, i.e. reacted, form after the hardening of the polysiloxane.

The thickness of the release layer (b) of the release film of the invention is preferably ≤5 µm, particularly preferably ≤2 µm, very particularly preferably from 0.3 µm to 1.5 µm.

It is preferable that the release film of the invention has, on at least one of its surfaces, a release layer (b), particularly preferably on a surface of the layer (s), i.e. immediately adjacent to the layer (s).

The release film of the invention preferably has at least one unfoamed layer (a) based on at least one thermoplastic polymer, preferably on at least one thermoplastic olefin homo- or copolymer, particularly preferably as backing layer of the release film of the invention.

Materials suitable for producing the layer (a) are olefin homo- or copolymers which are the same as those mentioned above and which can also be used for producing the layer (s).

It is very particularly preferable that the layer (a) is based on at least one propylene homo- or copolymer.

The thickness of the layer (a) of the release film of the invention is preferably from 5 to 30 µm, particularly preferably from 6 to 15 µm.

In another preferred embodiment, the layer (a) of the release film of the invention can have been bonded directly to at least one other unfoamed layer (c) preferably based on at least one olefin homo- or copolymer.

Materials suitable for producing the layer (c) are preferably olefin homo- or copolymers which are the same as those mentioned above and which can also be used for producing the layer (a) and/or layer (s).

It is very particularly preferable that the layer (c) is based on at least one propylene homo- or copolymer.

The respective uncovered surface of the layer (c) or, respectively, of the layer (a) or, respectively, of the layer (s) can, as external layer, optionally have been equipped with another release layer (b).

The thickness of the layer (c) of the release film of the invention is preferably from 5 to 30 μm, particularly preferably from 6 to 15 μm.

In another preferred embodiment, the laminate made of layer (s), of the layer (a), and layer (c) of the release film of the invention can have been bonded to another, unfoamed layer (d) preferably based on at least one olefin homo- or copolymer, by using the free surface of the layer (c).

Materials suitable for producing the layer (d) are olefin homo- or copolymers which are the same as those mentioned above and which can also be used for producing the layers (s) and/or (a) and/or (c).

It is very particularly preferable that the layer (d) as external layer is based on at least one propylene homo- or copolymer.

In this type of laminate, the free surface of the layer (d) and of the layer (s) respectively as external layer or respectively only one free surface of the laminate, preferably the surface of the layer (s), can be equipped with a release layer (b).

The thickness of the layer (d) of the release film of the invention is preferably from 5 to 30 μm, particularly preferably from 6 to 15 μm.

The release film of the invention can optionally have a barrier layer (e) preferably arranged between the layer (a) and the layer (c), or between the layer (c) and the layer (d).

The barrier layer (e) can also have been bonded directly or optionally by way of an adhesion-promoter layer (f) to the layer (s).

Said barrier layer (e) is preferably a gas-barrier layer, particularly preferably an oxygen-barrier layer and/or a water-vapor-barrier layer, or an oil-barrier layer.

It is preferable that the barrier layer (e) is based on at least one ethylene-vinyl alcohol copolymer, on at least one polyvinyl alcohol, or on at least one homo- or copolyamide, particularly preferably on at least one homo- or copolyamide.

Materials suitable for producing the barrier layer (e) are ethylene-vinyl alcohol copolymers and, respectively, polyvinyl alcohols which are the same as those mentioned above and which can also be used to produce the layers (s).

Suitable homo- or copolyamides are preferably thermoplastic aliphatic, semiaromatic, or aromatic homo- or copolyamides.

Said homo- or copolyamides can be produced from diamines, such as aliphatic diamines having from 2 to 10 carbon atoms, in particular hexamethylenediamine, and/or from aromatic diamines having from 6 to 10 carbon atoms, in particular p-phenylenediamine, and from aliphatic or aromatic dicarboxylic acids having from 6 to 14 carbon atoms, e.g. adipic acid, terephthalic acid, or isoterephthalic acid. It is also possible to produce homo- or copolyamides from lactams having from 4 to 10 carbon atoms, e.g. from ε-caprolactam. Polyamides used in the invention are preferably PA 6, PA 12, PA 66, PA 61, PA 6T, or appropriate copolymers, or a mixture of at least two of the polyamides mentioned.

The thickness of the barrier layer (e) of the release film of the invention is preferably from 3 μm to 25 μm, preferably from 5 μm to 15 μm.

In one preferred embodiment, the release film of the invention has at least one barrier layer (e) which has been arranged between the layer (s) and the layer (a) or between the layer (a) and the layer (c), and which has optionally respectively been bonded by way of an adhesion-promoter layer (f) and/or (g) to the adjacent layers.

Adhesion promoters used can be conventional adhesion promoters. It is preferable that the adhesion-promoter layers (f) and (g) are based, respectively mutually independently, on at least one modified thermoplastic polymer, preferably on at least one modified polyolefin homo- or copolymer, particularly preferably on at least one modified propylene homo- or copolymer, where this has been modified with at least one organic acid or with at least one organic anhydride, preferably with maleic anhydride.

The thickness of the adhesion-promoter layers (f) and (g) of the release film of the invention is preferably respectively mutually independently from 1 μm to 10 μm, particularly preferably from 2 μm to 8 μm.

In another embodiment, at least one layer (a) and/or layer (c) and/or layer (d) and/or the barrier layer (e) and/or at least one of the adhesion-promoter layers (f) and/or (g) can also have the layer (s), preferably only one layer (a), or the layer (s) can have the foam structure described above.

In one very preferred embodiment, the release film of the invention has a barrier layer (e) which is based on at least one homo- or copolyamide and which has respectively been bonded by way of an adhesion-promoter layer (f) and (g) to the layer (s) or, respectively, to the layer (a) having no foam structure, where these are respectively based on a propylene homo- or copolymer, where at least one free surface of the release film has been equipped with a release layer (b).

In another preferred embodiment, the release film of the invention has no barrier layer (e).

In another preferred embodiment, the release film of the invention has a layer (s) which has the foam structure which has been bonded to a layer (a) which has no foam structure and which in turn has been bonded to a layer (c) which has no foam structure, where the layers (s), (a), and (c) are respectively based on a propylene homo- or copolymer, where at least one free surface of the release film has been equipped with a release layer (b).

The release layer (b), and optionally the layers (s), (a), (c), and/or (d), and optionally the barrier layer (e), and/or optionally the adhesion-promoter layers (f) and/or (g) can if necessary respectively mutually independently have been doped with additives selected from the group consisting of antioxidants, antiblocking agents, antifogging agents, antistatic agents, active antimicrobial ingredients, light stabilizers, UV absorbers, UV filters, dyes, color pigments, stabilizers, preferably heat stabilizers, process stabilizers, and UV stabilizers and/or light stabilizers, preferably based on at least one sterically hindered amine (HALS), processing aids, flame retardants, nucleating agents, crystallization agents, preferably crystal nucleating agents, lubricants, optical brighteners, flexibilizers, sealing agents, plasticizers, silanes, spacers, fillers, peel additives, waxes, wetting agents, compounds having surface activity, preferably surfactants, and dispersing agents. The release effect of the release layer (b) has to be retained here.

The release layer (b), and optionally the layers (s), (a), and/or (c), and/or (d), and optionally the barrier layer (e), and/or optionally the adhesion-promoter layers (f) and/or (g) can respectively mutually independently, and optionally as layer (s), comprise at least 0.01 to 30% by weight, preferably at least 0.1 to 20% by weight, based in each case on the total weight of an individual layer, of at least one of the additives mentioned above.

The total thickness of the release film of the invention is preferably ≤100 μm.

The present invention further provides a process for producing the release film of the invention.

In one preferred embodiment, the layer (s) and optionally the other layers of the release film of the invention as entire multilayer film can be produced and processed in the form of a tubular film.

In another preferred embodiment, the layer (s) and optionally the other layers of the release film of the invention can be produced and processed in their entirety as cast multilayer film.

Accordingly, the individual layers (s) and optionally (a), (c), (d), (e), (f), and (g) of the release film of the invention can preferably be produced via coextrusion.

The foam structure of the layer (s) is obtained with the aid of hollow microparticles which have been distributed in the layer (s) and the shell of which is composed of a thermoplastic polymer, and within which there is at least one volatile, organic compound. For the formation of the foam structure, the as yet unexpanded microparticles are incorporated, with introduction of heat, preferably at a temperature of from 180 to 240° C., in the form of a masterbatch into the molten polymer to be foamed, and the expansion of the microparticles here occurs by virtue of expansion (volatilization) of the volatile, organic compounds present therein. In the case of, for example, incorporation in an extruder, these expanded microparticles are present in distributed form in the polymer material after discharge from the extruder die, and thus provide the foam structure.

The layer (s) or a laminate comprising at least one layer (s), that is to say, for example, a laminate comprising a layer (s) and a layer (a), or at least one layer (s), one layer (a), and one layer (c), and optionally one layer (d), can be coated on one or both surfaces, i.e. on one or both sides, preferably only on one side, with a mixture of at least one unhardened polysiloxane and optionally at least one leveling aid and/or at least one anchoring aid, and also optionally at least one additive mentioned above, and this mixture can be hardened via exposure to heat or to electromagnetic radiation, or via moisture, optionally via addition of at least one UV initiator and/or one free-radical initiator into the mixture, to give the release layer (b), and can be bonded to the layer (s) or to one of the layers of the laminates mentioned above. By virtue of the fact that the layer (s) has a foam structure, secure anchoring of the release layer (b) is advantageously achieved on that surface of the layer (s) that is uneven and rough and structured by virtue of the foam structure. There is therefore no requirement for any embossment as is the case in the production of known release films with smooth release layer surface. This also permits avoidance of the disadvantages of release films with embossment structure, for example relatively low stability of these on exposure to thermal and mechanical stress, e.g. with exposure to pressure, and the resultant inadequate release effect, at least at the damaged sites.

The person skilled in the art is well aware of the respective production processes and appropriate production parameters.

Each of the layers (a), (c), (d), (e), (f), and (g) of the release film of the invention can, and this is optionally also true for the layer (s), be subjected to a surface treatment, e.g. a corona treatment, a plasma treatment, and/or a flame treatment, preferably prior to the application of a release layer (b), and it is particularly preferable here to carry out a corona treatment.

The release film of the invention can preferably be a printed and/or colored film.

As mentioned previously, the release film of the invention has no embossment structure.

The release film of the invention is preferably used as removable protective film or protective-covering film, preferably for products which exhibit high adhesion even at ambient temperature.

The present invention therefore also provides the use of the release film of the invention as removable protective film or removable protective-covering film, preferably for self-adhesive labels, adhesive tapes, stickers or self-adhesive roof sheeting, preferably for self-adhesive bitumen roof sheeting.

The release film of the invention is preferably processed concomitantly in the production of rollable, self-adhesive roof-sheeting materials, preferably of rollable, self-adhesive bitumen roof-sheeting materials, as removable protective film or removable protective-covering film.

The present invention therefore further provides a rollable, self-adhesive roof-sheeting materials provided with a release film as removable protective film or as removable protective-covering film.

The present invention further provides a rolled, self-adhesive bitumen roof-sheeting material provided with a release film as removable protective film or as removable protective-covering film.

Determination of Separation Force (Release Effect)

The release effect of the release film of the invention with respect to an adhesive is given via the separation force in [cN/cm] required for separation, i.e. removal of the release film from the adhesive.

For this test, a test adhesive tape is applied, without including any air bubbles, to the entire width of a specimen of the release film of the invention or of a comparative film, for which the separation force is to be determined. Test adhesive tapes used are Tesafix A 7475 and Tesafix K 7476, the width of each of which is 25 mm. The dimensions to which the specimen is cut are such that there is in each case a longitudinal margin of 2 cm of release film on which the respective test adhesive tape is not present. The specimen is cut into a plurality of strips, each of length about 30 cm. The test strips are then placed between thin sheetmetal plates and loaded with weights; the distribution of the test strips between the plates here has to be such that all of the test strips are loaded uniformly (test strip loading: 6.8 kp or 70 g/cm$^2$). The test strips are then stored in an oven at 70° C. (test strips using Tesafix A 7475) or 40° C. (test strips using Tesafix K 7476) for a period of 20 h. A double-sided adhesive tape is then used to insert the test-strip edge without test adhesive tape into a metal rail (350×40 mm) fixed to a lower tensioning clamp of an electronic tear-testing machine. A stiff foil strip of length about 400 mm is secured to the test adhesive tape of the test strip, and is fixed within the tear-testing machine by means of an upper tensioning clamp. The test adhesive tape is now peeled at an angle of approximately 180° with a peel velocity of up to 1800 mm/min, and a force diagram is plotted to determine the adhesion. An average value is determined from 3 measurements in each case.

High-Temperature-Bitumen Test (HTB Test)

The HTB test serves to determine the maximum temperature at which the release film can still be peeled from an adhesive. Bitumen was used as adhesive.

A specimen of the release film of the invention or comparative film applied to bitumen is placed on two steel plates on the floor of an oven, and the specimen is conditioned at a temperature of at least 90° C. until a thermometer of which the temperature sensor has been lightly pressed into the bitumen in the rear region of the specimen between release film and bitumen indicates a constant temperature and the release film can no longer be separated from the bitumen.

The oven is then switched off. The temperature of the specimen then falls slowly, with the door open. The release film of the specimen is pulled uniformly to assess whether separation from the bitumen is possible. The HTB temperature is the temperature at which the release film of the specimen can be peeled from the bitumen of the specimen without leaving any residue.

The inventive examples and comparative examples below serve to illustrate the invention but are not to be considered as restrictive.

I. Chemical Characterization of Raw Materials Used

Inspire 137: Propylene copolymer from Dow
Bormod 904: Propylene homopolymer from Borealis
Durethan C38F: Copolyamide from Lanxess
Durethan B40FAM: PA6 polyamide from Lanxess
Lucofin 1400HN: Ethylene-butyl acrylate copolymer from Lucobit
Admer QB520E: Adhesion promoter from Mitsui
Luvofilm 9679: Lubricant
Advancel EMS-024: Hollow, spherical microparticles from Sekisui, with volatile hydrocarbons as contents
Polybatch UVS210: UV stabilizer
Polybatch P8555: Titanium(IV) dioxide (50% $TiO_2$) from Schulman, dispersed in polypropylene
Multibatch MP 52659: Antiblocking agent
Remafin RCL: Color masterbatch (white)
Polyblack P 7226: Color masterbatch (black)
L066: Silicone oil from Wacker (leveling aid)
Anchorsil 2000: Anchoring aid from Momentive
Polysiloxane: Polysiloxane with crosslinking agent and catalyst from Wacker

II. Production of Release Films

The release films of the Comparative Example (C), and also of Inventive Example 3 (IE3) are in each case composed of six layers. The release films of Inventive Examples IE1 and IE2 are composed of four and, respectively, five layers. The total layer thickness of the release films of the Comparative Example (C), and also of Inventive Example (IE3) is respectively 26 μm. The total layer thickness of the release films of Inventive Examples IE1 and IE2 is respectively 23.5 μm and 24.5 μm. In each case, the individual layers of the release films are immediately adjacent to one another in the sequence in which they have been listed below. The individual layers (s), (a), (c), (e), (f), and (g) of the release films of Inventive Example IE3, and also of C, were respectively produced via blown-film coextrusion, and were coated respectively with a release layer (b) in a subsequent operation. The individual layers (s), (a), (c), and (d) of the release films of Inventive Examples IE1 and IE2 were respectively produced via blown-film coextrusion and were coated on one side and, respectively, both sides with a release layer (b) in a subsequent operation. The foam structures of the layer (s) of the release films of Inventive Examples IE1-IE3 is based on expanded, hollow microparticles distributed in the layer (s). In contrast, the release film of the Comparative Example C has no foam structure, but instead has been equipped with an embossment structure. The embossment structure is based on a regular crepe-paper-like pattern, and its embossment height is from 180 to 240 μm. The embossment in Comparative Example C was achieved by a conventional embossing process known to the person skilled in the art, with use of an embossing roll.

III. Inventive Examples and Comparative Example

All of the % data below are % by weight values.

III.1 Inventive Example 1

| Layer structure IE1 | Raw materials IE1 |
| --- | --- |
| Release layer (b) layer thickness (1.0 μm) | Polysiloxane (92.8%), Anchorsil 2000 (2.6%), L066 (4.6%) |
| Layer (s) (layer thickness 7.5 μm) | Inspire 137 (98%), Luvofilm 9679 (0.5%) Advancel EMS-024 (0.5%) |
| Layer (a) (layer thickness 7.5 μm) | Inspire 137 (86%), Polyblack P 7226 (14%) |
| Layer (c) (layer thickness 7.5 μm) | Inspire 137 (89.5%), Luvofilm 9679 (0.5%) Remafin RCL (10%) |

III.2 Inventive Example 2

| Layer structure IE2 | Raw materials IE2 |
| --- | --- |
| Release layer (b) layer thickness (1.0 μm) | Polysiloxane (92.8%), Anchorsil 2000 (2.6%), L066 (4.6%) |
| Layer (s) (layer thickness 7.5 μm) | Inspire 137 (98%), Luvofilm 9679 (0.5%) Advancel EMS-024 (0.5%) |
| Layer (a) (layer thickness 7.5 μm) | Inspire 137 (86%), Polyblack P 7226 (14%) |
| Layer (c) (layer thickness 7.5 μm) | Inspire 137 (89.5%), Luvofilm 9679 (0.5%) Remafin RCL (10%) |
| Release layer (b) (layer thickness 1.0 μm) | Polysiloxane (92.8%), Anchorsil 2000 (2.6%), L066 (4.6%) |

III.3 Comparative Example C and Inventive Example IE3

| Layer structure (in each case for C and IE3) | Raw materials C | Raw materials IE3 |
| --- | --- | --- |
| Release layer (b) layer thickness (1.0 μm) | Polysiloxane (92.8%), Anchorsil 2000 (2.6%), L066 (4.6%) | Polysiloxane (92.8%), Anchorsil 2000 (2.6%), L066 (4.6%) |
| Layer (s) (layer thickness 7.5 μm) | Inspire 137 (35%), Bormod 904 (47%), Luvofilm 9679 (0.5%) Polybatch P8555 (17.5%) unfoamed | Inspire 137 (35%), Bormod 904 (47%), Luvofilm 9679 (0.5%), Advancel EMS-024 (0.5%) Polybatch P8555 (17.0%) (foamed) |
| Adhesion-promoter layer (f) (layer thickness 2.5 μm) | Admer QB520E (50%), Inspire 137 (50%) | Admer QB520E (50%), Inspire 137 (50%) |
| Barrier layer (e) (layer thickness 5.0 μm) | Durethan C38F (70%), Durethan B40FAM (30%) | Durethan C38F (70%), Durethan B40FAM (30%) |

-continued

| Layer structure (in each case for C and IE3) | Raw materials C | Raw materials IE3 |
|---|---|---|
| Adhesion-promoter layer (g) (layer thickness 2.5 μm) | Admer QB520E (50%), Inspire 137 (50%) | Admer QB520E (50%), Inspire 137 (50%) |
| Layer (c) (layer thickness 7.5 μm) | Inspire 137 (35%), Bormod 904 (52.5%), Luvofilm 9679 (0.5%), Polyblack P 7226 (12%) | Inspire 137 (35%), Bormod 904 (52.5%), Luvofilm 9679 (0.5%), Polyblack P 7226 (12%) |

IV. Determination of Adhesion and of HBT Temperature

Adhesion, and also HBT temperature, was determined for the release films of Inventive Example 3 (IE3), and also for the embossed release film of Comparative Example C, in each case by the methods described above.

| Inventive Example/Comparative Example | Adhesion (cN/cm) | HBT temperature (° C.) |
|---|---|---|
| C | 5.7 | 64 |
| IE3 | 4.1 | 77 |

What is claimed is:

1. A release film comprising at least one layer (s) with a closed-cell foam structure of at least one thermoplastic polymer,
   where the closed-cell foam structure is formed of expanded, hollow thermoplastic microparticles, the expansion of which has been achieved by virtue of at least one volatile organic compound present in the cavity of the microparticles,
   where the diameter of the expanded, hollow thermoplastic microparticles is from 30 μm to 300 μm, and the average diameter of the expanded hollow thermoplastic microparticles is greater than the overall thickness of the release film, thereby providing the release film with a rough and uneven surface,
   where at least one of the surfaces of the release film is provided with a release layer (b) as external layer, formed of at least one crosslinked polysiloxane, and connected to said at least one layer (s) with an anchoring aid,
   where the melting point of the thermoplastic polymer of the layer (s) is lower than that of the thermoplastic polymer of which the hollow thermoplastic microparticles are formed.

2. The release film as claimed in claim 1, wherein the diameter of the expanded, hollow thermoplastic microparticles is from 70 to 200 μm.

3. The release film as claimed in claim 1, wherein the overall density of the layer (s) is from 0.2 to 1.2 g/cm$^3$.

4. The release film as claimed in claim 1, wherein the release layer (b) comprises at least one levelling aid.

5. The release film as claimed in claim 4, wherein the at least one levelling aid comprises at least one polysiloxane having at least one functional group having at least one carbon double bond.

6. The release film as claimed in claim 4, wherein the release layer (b) contains from 1 to 10% by weight the at least one of a levelling aid and from 1 to 5% by weight of anchoring aid, based in each case on the total weight of the release layer (b).

7. The release film of claim 1, wherein the anchoring aid comprises at least one polysiloxane having at least one functional group selected from the group consisting of a functional group having at least one carbon double bond, an epoxy group, an isocyanate group, a hydroxy group, alkoxysilane group and a silane group.

8. The release film as claimed in claim 1, wherein the at least one layer (s) is formed of at least one olefin homo- or copolymer.

9. The release film as claimed in claim 8, wherein the free surface of the at least one layer (s) is bonded to at least one layer (a) which has no foam structure and which is formed of at least one olefin homo- or copolymer.

10. The release film as claimed in claim 9, wherein the free surface of said at least one layer (a) is bonded to an unfoamed layer (c) formed of at least one olefin homo- or copolymer and the free surface of the layer (c) can be bonded to at least one other layer (d) which has no foam structure and which is formed of at least one olefin homo- or copolymer.

11. The release film as claimed in claim 10, further comprising at least one barrier layer (e) which is arranged between the layer (a) and the layer (c) or between the layer (c) and the layer (d), and which is optionally bonded by means of an adhesion-promoter layer (f) and/or (g) to the layer (a) or, respectively, the layer (c) or, respectively, the layer (d).

12. The release film as claimed in claim 11, wherein barrier layer (e) which is formed of at least one homo- or copolyamide and is bonded by means of an adhesion-promoter layer (f) and/or (g) to the layer (a) or, respectively, to the layer (c) or, respectively, to the layer (d).

13. Self-adhesive labels, adhesive tapes, stickers or self-adhesive roof sheeting provided with the release film of claim 1 as a removable protective film or removable protective-covering film.

14. A rollable, self-adhesive roof-sheeting material provided with the release film of claim 1 as removable protective film or as removable protective-covering film.

15. A rolled, self-adhesive bitumen roof-sheeting material provided with the release film of claim 1 as removable protective film or as removable protective-covering film.

* * * * *